United States Patent
Komatsu

(10) Patent No.: US 10,571,009 B2
(45) Date of Patent: Feb. 25, 2020

(54) MAGNETICALLY RESPONSIVE LOCKING MECHANISM FOR A VEHICLE DIFFERENTIAL

(71) Applicant: GKN Automotive Limited, Worcestershire (GB)

(72) Inventor: Toshiaki Komatsu, West Bloomfield, MI (US)

(73) Assignee: GKN Automotive Limited, Worcestershire (GB)

( * ) Notice: Subject to any disclaimer, the term of this patent is extended or adjusted under 35 U.S.C. 154(b) by 266 days.

(21) Appl. No.: 15/704,590

(22) Filed: Sep. 14, 2017

(65) Prior Publication Data

US 2019/0078676 A1    Mar. 14, 2019

(51) Int. Cl.
| | |
|---|---|
| F16H 48/34 | (2012.01) |
| H01F 7/16 | (2006.01) |
| F16D 11/14 | (2006.01) |
| F16D 27/118 | (2006.01) |
| F16H 48/24 | (2006.01) |
| F16H 48/08 | (2006.01) |

(52) U.S. Cl.
CPC ............ *F16H 48/34* (2013.01); *F16D 11/14* (2013.01); *F16D 27/118* (2013.01); *F16H 48/24* (2013.01); *H01F 7/16* (2013.01); *F16H 48/08* (2013.01); *F16H 2048/346* (2013.01)

(58) Field of Classification Search
CPC .......... F16H 48/34; F16H 48/24; F16D 27/09; F16D 27/118
See application file for complete search history.

(56) References Cited

U.S. PATENT DOCUMENTS

| | | | |
|---|---|---|---|
| 8,050,829 B2 | 11/2011 | Johnson et al. | |
| 8,926,471 B2 * | 1/2015 | Yamanaka | F16H 48/22 475/331 |
| 9,797,495 B2 * | 10/2017 | Inose | F16D 11/00 |
| 10,323,738 B2 * | 6/2019 | Komatsu | F16H 48/34 |

(Continued)

FOREIGN PATENT DOCUMENTS

| | | |
|---|---|---|
| JP | 2004183874 | 7/2004 |
| JP | 2005195099 A | 7/2005 |

(Continued)

OTHER PUBLICATIONS

Written Opinion & International Search Report for PCT/US2018/049022 dated Dec. 25, 2018, 17 pages.

*Primary Examiner* — Sherry L Estremsky
(74) *Attorney, Agent, or Firm* — Jennifer M. Brumbaugh; Reising Ethington P.C.

(57) ABSTRACT

A system for a vehicle differential includes a magnetic field generator, a drive member and a lock member. The drive member is movable in response to a magnetic field between a first position and a second position, and the drive member has at least one contact surface. The lock member adjacent to the drive member and having at least one contact surface that is engaged by at least one contact surface of the drive member so that the lock member is driven by the drive member to engage a gear of the differential when the drive member is in the second position, and the lock member is adapted to be disengaged from the gear when the drive member is in the first position. One or both of the drive member and the lock member has at least one contact surface that is discontinuous.

19 Claims, 7 Drawing Sheets

(56) References Cited

U.S. PATENT DOCUMENTS

2007/0054771 A1\* 3/2007 Fusegi .................... F16H 48/08
  475/231
2016/0341257 A1 11/2016 Yamanaka et al.

FOREIGN PATENT DOCUMENTS

| KR | 20110096486 A | 8/2011 |
| WO | WO2015121968 A1 | 8/2015 |
| WO | WO2017100550 A1 | 6/2017 |

\* cited by examiner

US 10,571,009 B2

MAGNETICALLY RESPONSIVE LOCKING MECHANISM FOR A VEHICLE DIFFERENTIAL

TECHNICAL FIELD

The present disclosure relates generally to a magnetically responsive locking mechanism for a vehicle differential.

BACKGROUND

During normal operation of a motor vehicle, it is common that all four wheels are not turning at an identical rate of speed. Different wheel turn rates are most commonly encountered when the vehicle is making a turn, but may also be caused by braking or non-uniform road surface conditions. In order to accommodate differing wheel turning rates while continuing to direct power to two wheels it is possible to provide a differential that allows for different wheel turn rates between the powered wheels. The differential allows the wheels to spin at different rates while transmitting torque to each wheel. While this solution may be satisfactory in some driving conditions, it is unsatisfactory under conditions where one of the driven wheels experiences a surface having a much lower coefficient of friction than a surface engaged by the other wheel(s). Such conditions may prevent the application of torque to a wheel with more traction, thereby resulting in undesired vehicle performance. A locking mechanism may be provided to lock the differential and prevent different wheel spin rates and transmit torque uniformly between two wheels in at least some circumstances.

SUMMARY

In at least some implementations, a system for a vehicle differential that has multiple gears includes a magnetic field generator that selectively generates a magnetic field, a drive member and a lock member. The drive member is movable in response to the magnetic field generated by the magnetic field generator between a first position and a second position, and the drive member has at least one contact surface. The lock member adjacent to the drive member and having at least one contact surface that is engaged by at least one contact surface of the drive member so that the lock member is driven by the drive member to engage a gear of the differential when the drive member is in the second position, and the lock member is adapted to be disengaged from the gear when the drive member is in the first position. One or both of the drive member and the lock member has at least one contact surface that is discontinuous.

In at least some implementations, the discontinuous contact surface includes one or more voids formed in the drive member and/or the lock member. The drive member and/or lock member may include a main body and one or more than one foot extending from the main body, and the contact surface may be defined by an outer end of the foot. In such implementations, the discontinuous contact surface may be defined at least in part by one or more voids formed in at least one foot. The voids may include multiple grooves that are separate from each other or at least some of the grooves may intersect each other. One or more voids may include an opening extending axially into the foot or plunger. A passage may be provided that extends through the foot axially spaced from an axial end of the foot, and passage may communicate with the opening. One or more voids may extend to one or more peripheral edges of the foot such that the one or more voids are communicated with an exterior of the foot.

In at least some implementations, an apparatus for a vehicle differential includes a drive member and a lock member. The drive member has an axis and including an annular main body with multiple feet extending from the main body, at least one foot having a contact surface. The lock member has an axis and including an annular main body with multiple feet extending from the main body, at least one foot of the lock member having a contact surface engageable by one or more of the contact surfaces of the drive member. The contact surface of one or both of the drive member and the lock member has a first portion at a first height and a second portion at a second height that is different than the first height.

In at least some implementations, the feet are cantilevered to the main body and have a free end on which the contact surface is defined. The contact surface may be defined at least in part by one or more voids formed in at least one foot. The voids may include multiple grooves and the grooves are either are separate from each other or at least some of the grooves intersect each other. At least one void may extend to at least one peripheral edge of the foot.

BRIEF DESCRIPTION OF THE DRAWINGS

The following detailed description of preferred implementations and best mode will be set forth with regard to the accompanying drawings, in which.

DETAILED DESCRIPTION

Figure 1:
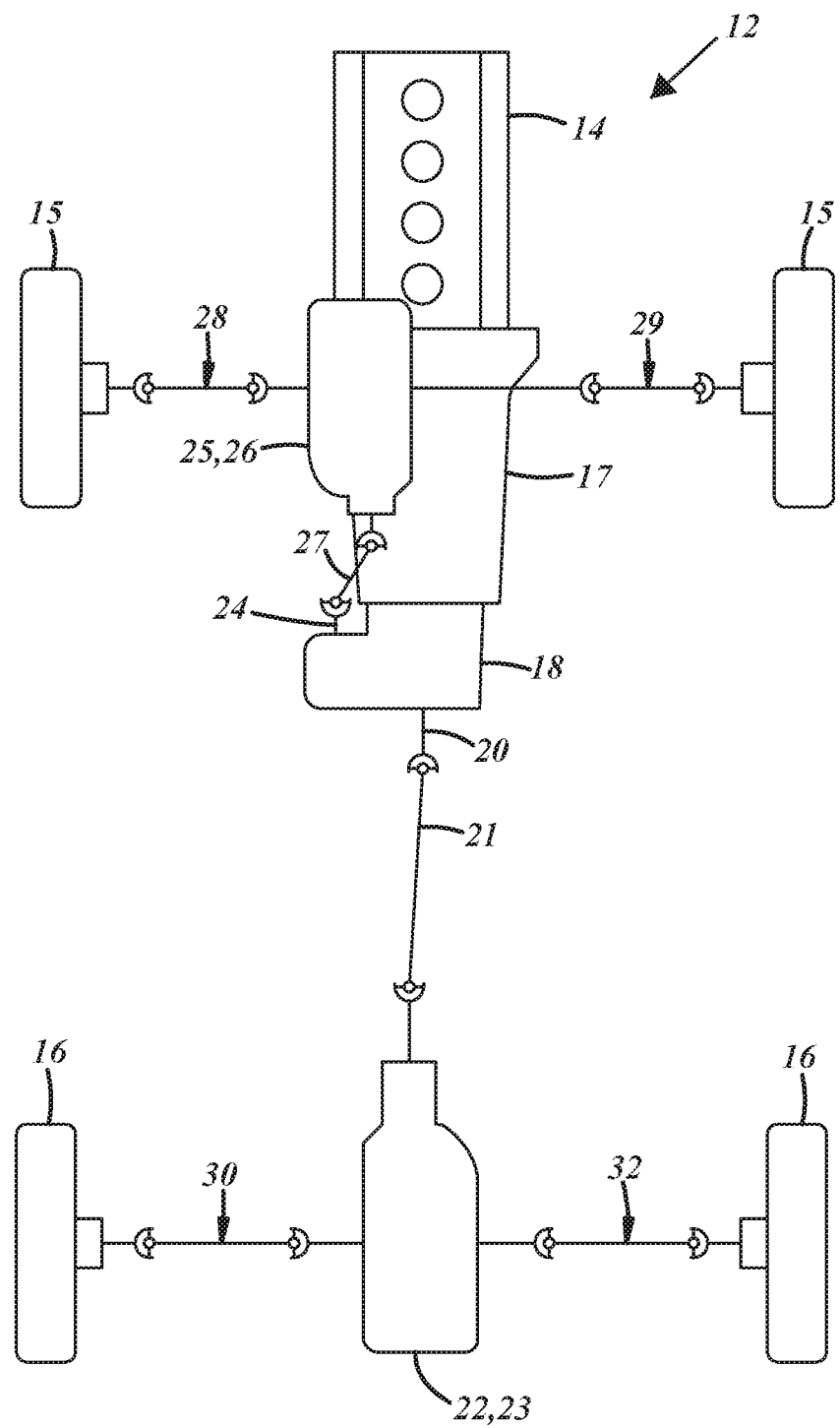
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16. Of course, other driveline configurations may be used, as desired.

Figure 2:
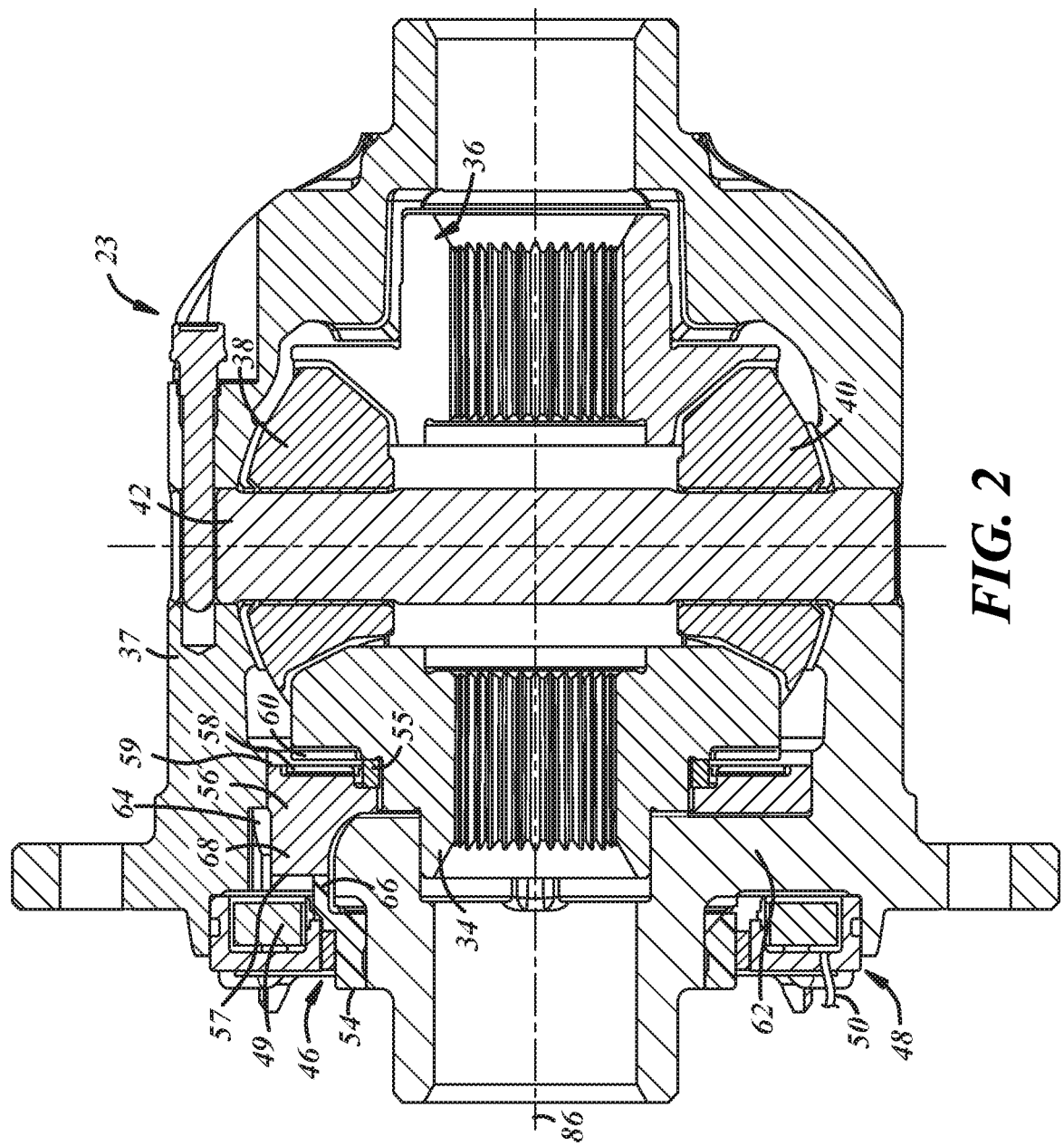
FIG. 2 is a cross-sectional view of a differential with an electrically actuated locking mechanism, wherein the differential is shown in an open position.

Referring now to FIG. 2, the first rear side shaft 30 is connected to a first side gear 34 within the differential 23. Similarly, the second rear side shaft 32 is connected to a second side gear 36 within the differential 23. The differential 23 includes side gears 34, 36 that are generally carried within a housing 37 of the differential 23 and are rotatably coupled to the side shafts 30, 32, respectively. The differential also includes pinion gears 38, 40 that are meshed with side gears 34, 36, respectively, and which are mounted within the housing 37 on a pinion shaft 42.

To selectively lock and unlock the differential 23 a locking mechanism 46 is provided. The locking mechanism 46 may have actuated and deactuated states, and in one state the locking mechanism couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the locking mechanism 46 is electrically actuated and includes a solenoid 48 having an annular wire coil 49 and a drive member that may include an armature or plunger 54 received at least partially within the coil. In at least some implementations, the plunger 54 is also annular, the plunger and coil 49 are coaxially arranged and carried by the housing 37 for rotation with the housing, and one side shaft (here, the second side shaft 32) extends coaxially through the coil and plunger. Electric power is supplied to the coil 49 via a power wire 50 to generate a magnetic field that displaces the plunger 54 relative to the coil from a first or retracted position to a second or advanced position. To facilitate return of the plunger 54 from the second position back to the first position when power is not provided to the coil 49, a biasing member, such as a spring 55 (FIG. 2) may act on the plunger 54, or on a component engaged with the plunger, as set forth below. In at least some implementations, the locking mechanism 46 is actuated when the plunger 54 is in the second position and the locking mechanism is deactuated when the plunger is in the first position. While in the example shown the plunger 54 is in its second position when power is provided to the coil 49 and the plunger moves to the first position when power is not supplied to the coil, the opposite could be true if desired (e.g. the locking mechanism 46 could be moved to the actuated position by the biasing member 55 and deactuated by powering the coil).

In at least some implementations, the locking mechanism 46 may further include or be associated with a lock member 56 adapted to be driven by the plunger 54 and to interface with the side gear 36 as set forth below. The lock member 56 may be generally annular and a portion of the second side gear 36 and/or shaft 32 may extend through the lock member. The lock member 56 may include a rear face 57 engageable by the plunger 54 and a front face 59 having at least one engagement feature 58, such as gear or clutch teeth (e.g. dog clutch teeth) configured to engage a corresponding engagement feature 60 (e.g. gear or dog clutch teeth) formed on a rear face of the first side gear 34. The spring 55 may act on the lock member 56 to urge the lock member into the plunger 54 and move the plunger to its first position when the coil 49 is not powered, as noted above. In the implementation shown, the plunger 54 is located adjacent to one side of a housing wall 62 and the lock member 56 is located adjacent to the other side of the wall 62. The wall 62 includes apertures 64, and the plunger 54 and lock member 56 include axially extending feet 66, 68 (e.g. FIGS. 2 and 3), respectively, that extend into or through the apertures 64 in the wall so that the plunger and lock member are engaged with each other across or through the wall. Like the coil 49 and plunger 54, the lock member 56 also is carried by and rotates with the housing 37.

Figure 3:
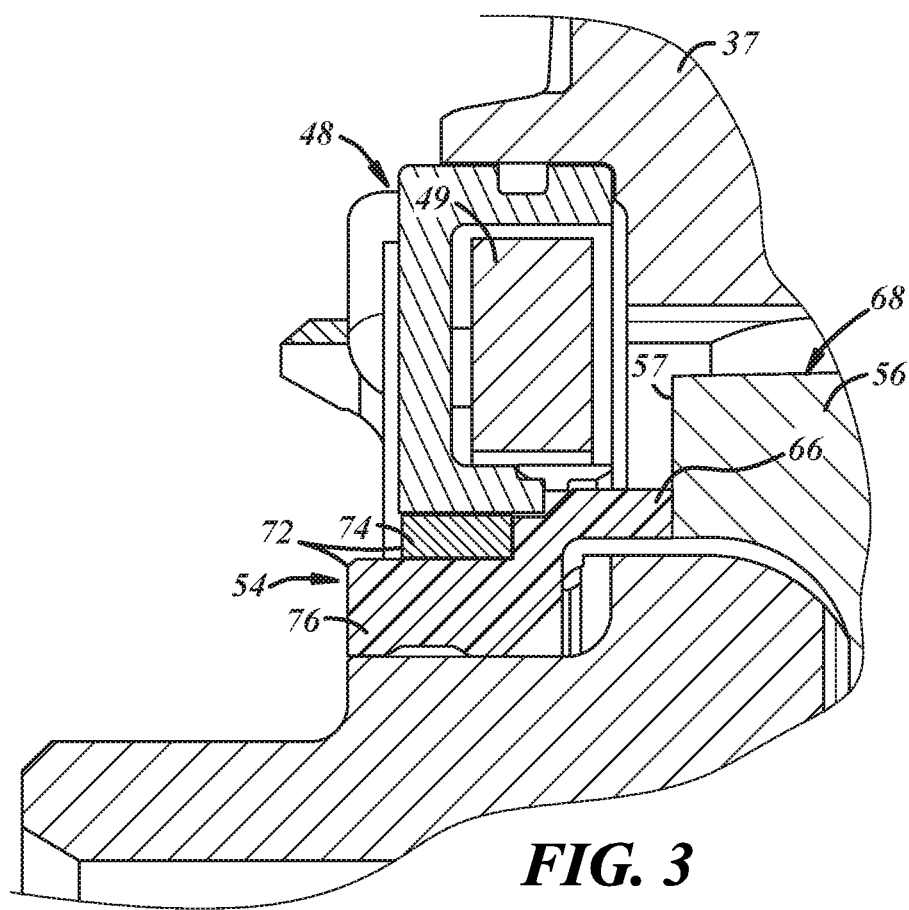
FIG. 3 is a fragmentary cross-sectional view of a portion of the differential, illustrating the locking mechanism.

The differential 23 illustrated in FIGS. 2 and 3 is shown in an open mode or position (FIG. 2). In the illustrated implementation, in the open position of the differential, the coil 49 is not powered, the plunger 54 is in its first position and the lock member 56 is not engaged with the side gear 36 so that the side gear can rotate relative to the lock member 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the lock member 56 into engagement with the side gear 36 (i.e. teeth 58 engage teeth 60). Hence, the side gear 36 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

As shown in FIGS. 2-8, the plunger 54 may be formed from multiple materials include a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced. In the example set forth herein, the plunger 54 needs to move between the advanced and retracted positions with sufficient force and speed to permit effective operation of the locking mechanism 46. Thus, while all materials may be affected in some way by a magnetic field, especially a field of great strength or magnitude, not all materials are magnetically responsive as that term is used in this disclosure.

For example, iron, nickel and cobalt are often cited as being magnetically responsive as they are relatively strongly affected by magnetic fields. While not limited to steel, one material of the plunger 54 may include various grades of steel which are known to be ferromagnetic and relatively strongly magnetically responsive. Conversely, materials like wood, plastic and glass are often cited as being not magnetically responsive as they are very weakly affected/attracted by magnetic fields. Of course, magnetically responsive materials may be combined with materials that are not magnetically responsive to create a component that is magnetically responsive (e.g. b nixing magnetic materials into a polymeric material).

In at least some implementations, the plunger 54 includes a main body 72 that has or is defined by a first body 74 and a second body 76 that are coupled together by one or more attachment features, or by opposed and overlapped surfaces that inhibit or prevent separation of the first body and second body, or both. Non-limiting examples of attachment features include mated projections and voids, where the projections may include flanges, tabs, fingers, tongues and the like, and the voids may include slots, holes, areas adjacent to undercut portions of a body and the like. In at least some implementations, the first body 74 and second body 76 are integrally coupled together so that they move as a single component and are not separated during use. Further, in at least some implementations, the first body 74 and second body 76 may be arranged so that they are not separated without destruction (e.g. cutting or breaking) of a portion of at least one of the bodies. In the example shown, the first body 74 is annular and formed of a ferromagnetic metal and the second body 76 is annular and formed of a non-ferromagnetic material which may include a polymeric or composite material. Of course, the plunger 54 can be formed from a single material and need not be made from multiple materials.

Figure 4:
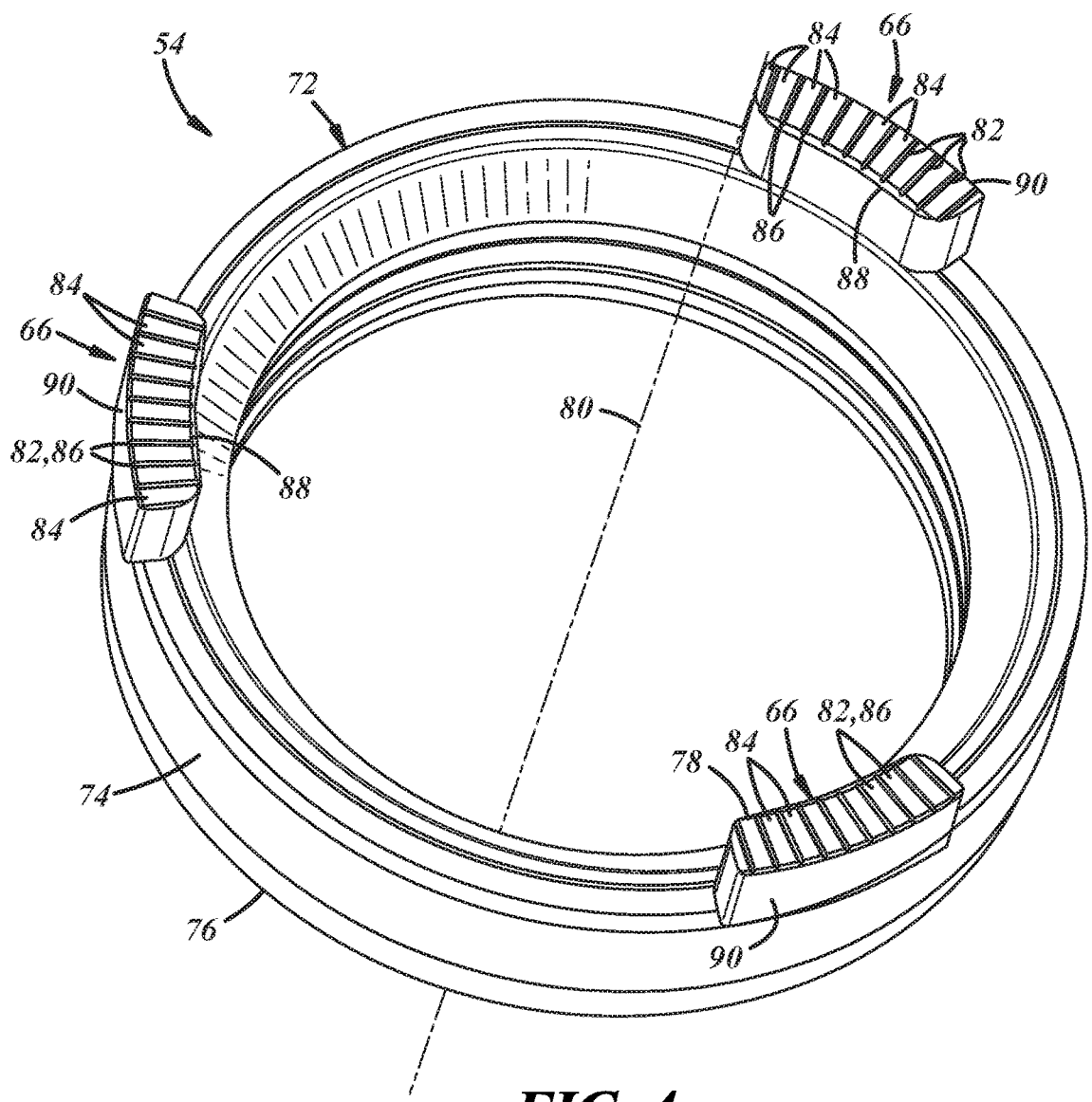
FIG. 4 is a perspective view of a plunger of the locking mechanism.
Figure 5:
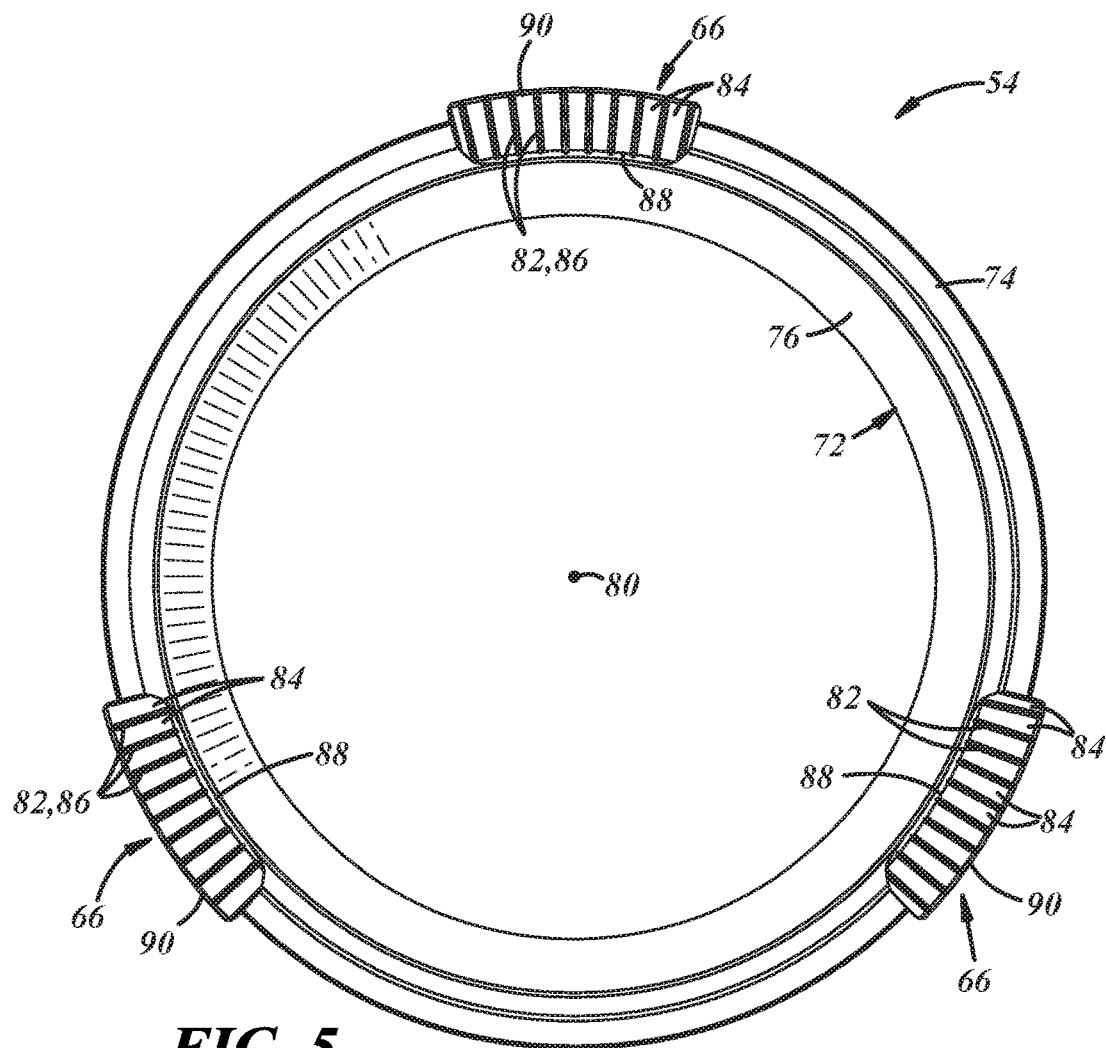
FIG. 5 is a perspective view of the plunger.

As shown in FIGS. 4 and 5, the feet 66 of the plunger 54 may be cantilevered from and extend axially from the main body 72 of the plunger to a free or axial end 78 spaced axially from the main body 72. Any number of feet 66 may be provided and they may be spaced apart circumferentially in any desired arrangement. Each foot 66 may be considered to have circumferential length, a radial width and an axial height, relative to a rotational axis 80 of the plunger 54. The free, axial end 78 of each foot 66 may define a contact surface that faces the lock member 56 and, in at least some implementations, engages an aligned and oppositely facing contact surface of a foot 68 of the lock member 56 at least when the plunger 54 is advanced to move the lock member. The axial end 78 of one or more and up to all of the plunger feet 66 may include a void 82 such that the contact surface is discontinuous. In at least some implementations, the axial end 78 of one or more feet 66 is discontinuous in that it or they have a first portion 84 at a first axial height and a second portion 86 at a different axial height. That is, the surface is not entirely planar. In at least some implementations, the second portion 86 is defined by one or more voids 82 formed in the foot 66, and the first portion 84 defines the contact surface and is defined by one or more areas not including the void(s) 82, and is axially raised relative to the void(s). In the example shown in FIGS. 4 and 5, the voids are shown as grooves 82 that extend radially or generally radially (i.e. within 30 degrees of radially) from a radially inner side 88 of the feet 66 to a radially outer side 90 of the feet. Hence, the grooves 82 extend fully across the axial end 78 of each foot 66 and are open at two locations to the periphery of each foot, where the periphery includes the exterior surfaces of the foot. The first portion 84, in this example, includes a plurality of lands or peaks defined between the grooves 82 as well as between the periphery or peripheral edges of the axial end 78 and adjacent groove(s) 82, and the first portions collectively define the contact surface. In at least some implementations, the first portion 84 is defined at least in part by the grooves 82 in that the first portion is defined by the portions of the end 78 of the foot 66 that are not grooved. In at least some implementations, the lands may be generally planar and at the same axial height.

In FIGS. 6-10, different examples of voids are shown that may be provided within one or more feet 66 of the plunger 54. In these figures, some reference numerals used to describe features of the plunger shown in FIGS. 2 to 5 are used to designate the same or similar features, to facilitate description and an understanding of these and related features.

Figure 6:
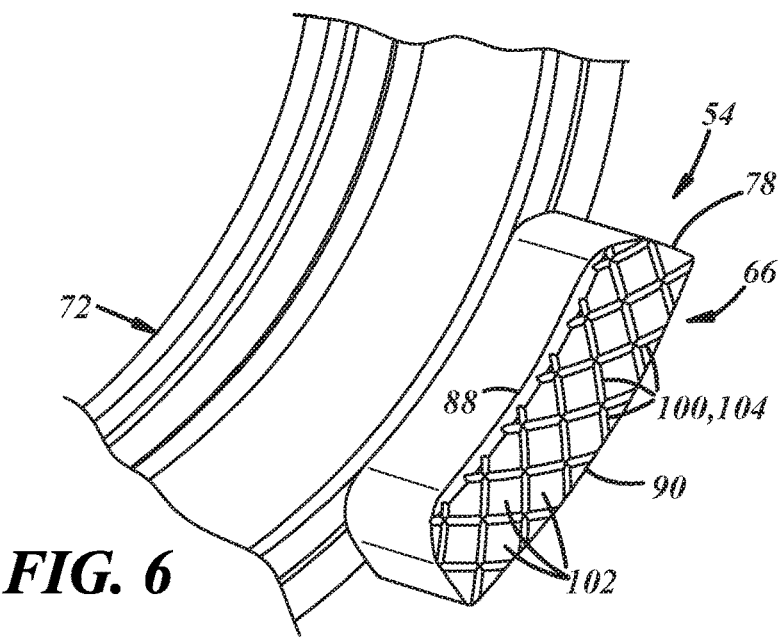
FIG. 6 is a fragmentary perspective view of a portion of a plunger.

In FIG. 6, the axial ends 78 of the plunger feet 66 are shown as having voids in the form of intersecting grooves 100 in a generally cross-hatched pattern (e.g. two or more sets of generally parallel and intersecting lines, where the sets of lines are at different angles). The grooves 100 could be formed at any desired orientation and are shown as being formed at about forty-five degrees relative to the radial direction, with oppositely inclined grooves intersecting at right angles, although other angles may be used. In the example shown here, two sets of grooves are provided where the grooves are portions of circles, the grooves in a set are radially spaced apart, and the two groups are arranged about axes that are offset from each other and from the axis of the plunger 54. One or more of the grooves 100 may be open to the periphery of the feet 66 and in some implementation, multiple grooves 100 open to the periphery of each foot. Multiple, separate or spaced apart first portions 102 are defined partially by and between intersecting grooves 100 and between the periphery of the axial end 78 and some of the grooves or portions of grooves, and the first portions may be generally planar and at the same axial height, if desired. One or more second portions 104 is/are defined by or within the grooves 100.

Figure 7:
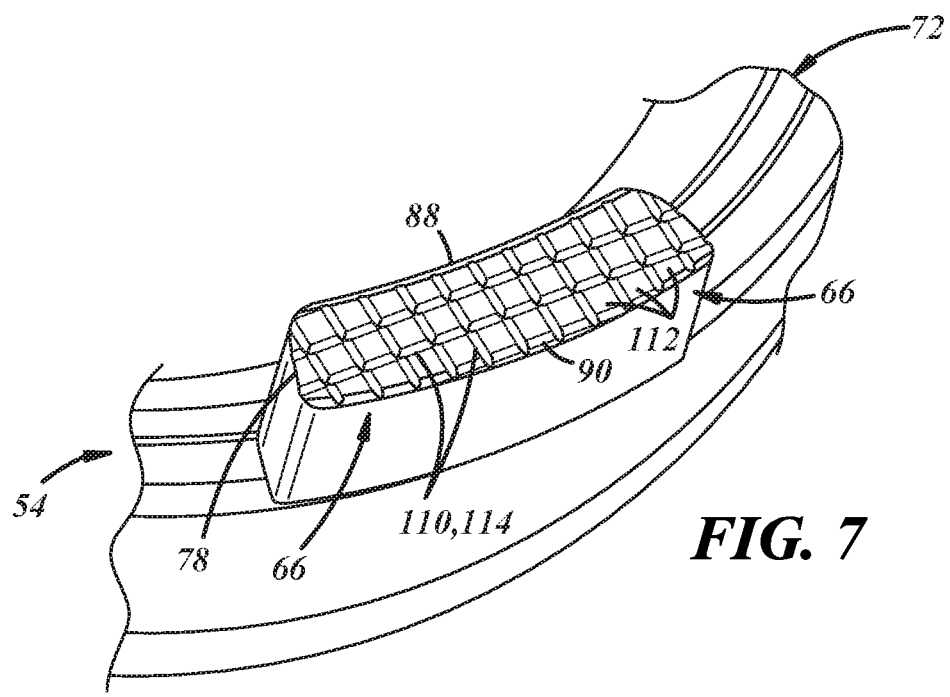
FIG. 7 is a fragmentary perspective view of a portion of a plunger.

In FIG. 7, the axial end 78 of the foot 66 is shown as having intersecting grooves 110 with portions extending generally radially and portions extending generally circumferentially or tangentially (i.e. parallel to tangent lines at the periphery of a circumferential midpoint of the feet). These grooves 110 likewise intersect at about right angles, although other grooves at other orientations and intersection angles could be used. One or more of the grooves 110 may be open to the periphery of the feet 66 and in some implementation, multiple grooves open to the periphery of each foot. Multiple first portions 112 are defined between intersecting sections of the grooves 110 and between the periphery of the axial end and some of the grooves, and the first portions may be generally planar and at the same axial height, if desired. One or more second portions 114 is/are defined by or within the grooves 110.

Figure 8:
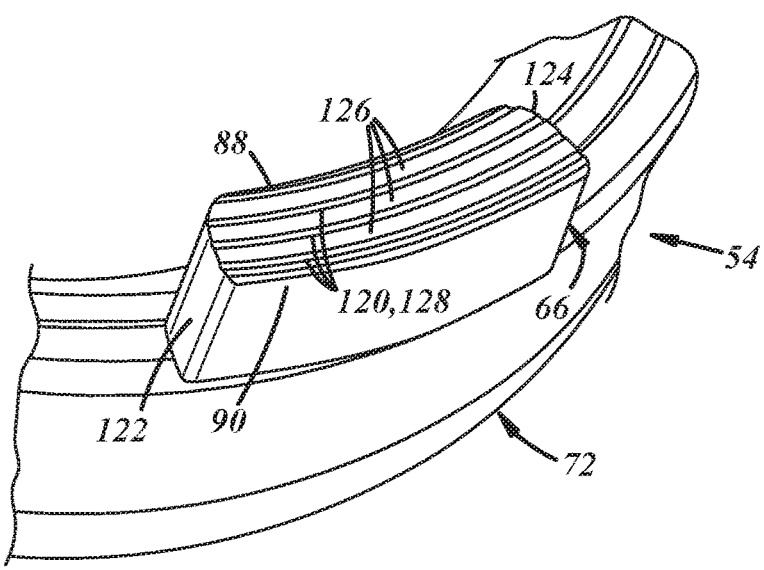
FIG. 8 is a fragmentary perspective view of a portion of a plunger.

In FIG. 8, the foot 66 is shown as including voids/grooves 120 that extend generally circumferentially, that is from one circumferential side 122 to the other circumferential side 124 of the foot 66. One or more of the grooves 120 may be open to the periphery of the foot and in some implementation, multiple grooves open to the periphery of the foot. Multiple first portions 126 are defined between the grooves and between the periphery and an adjacent groove, and the first portions may be generally planar and at the same axial height, if desired. One or more second portions 128 is/are defined by or within the grooves 120.

Figure 9:
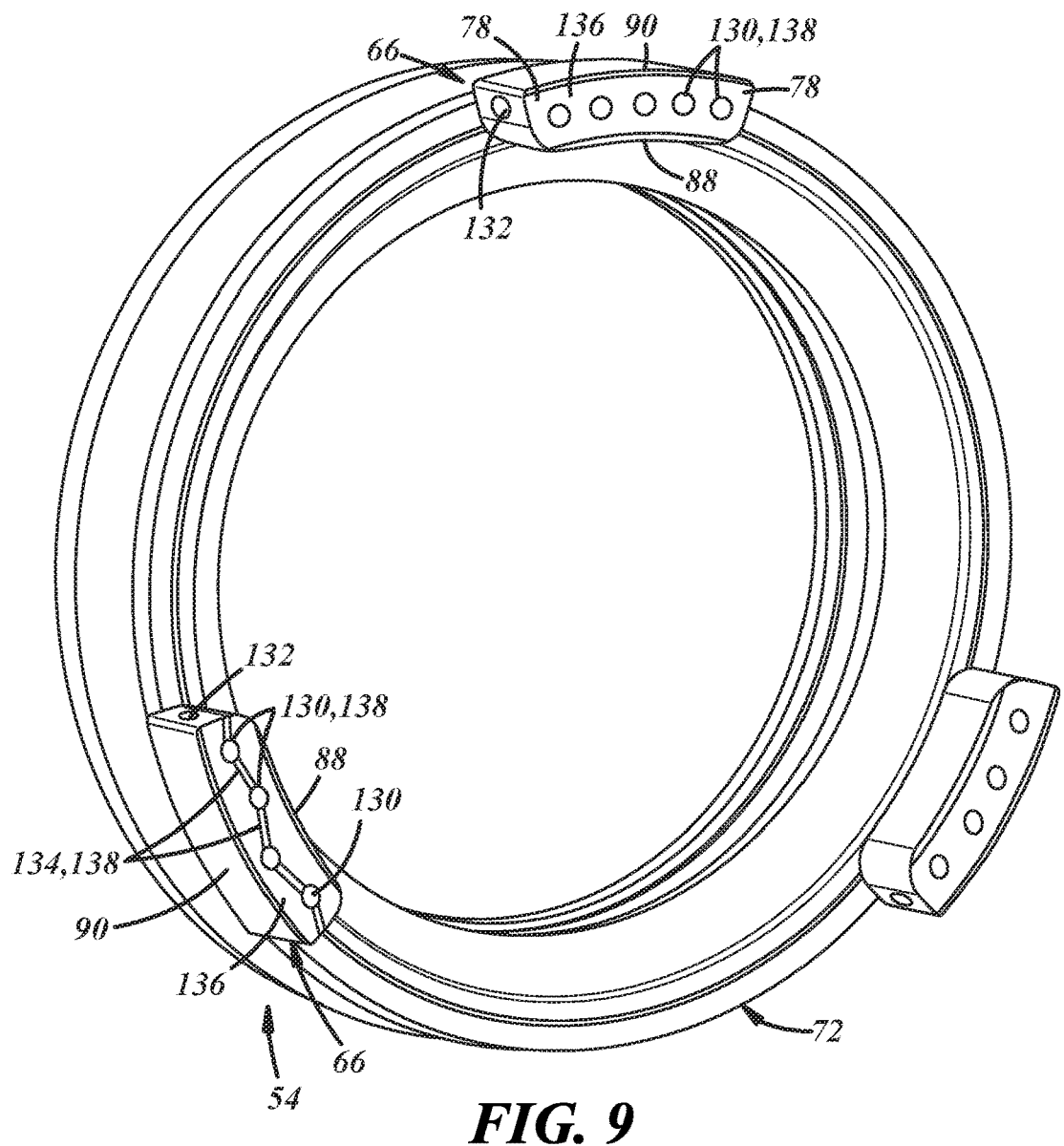
FIG. 9 is a fragmentary perspective view of a portion of a plunger.

In FIG. 9, the voids are shown as including one or more openings 130, bores, cavities or passages formed in the axial end 78 of the feet 66 and extending axially into the feet. A foot 66 (or more than one foot) may also include one or more cross passages 132 that is/are located spaced from the axial end 78 of the foot 66, is open to the periphery of the foot, and may be open to or communicate with the periphery of the foot at two locations. The cross passage 132 may be open to one or more of the openings 130 such that the openings are communicated with the periphery of the foot via the cross passage. One or more of the feet 66 may also include one or more grooves or slots 134 formed in the axial end 78 that extend between and communicate with at least some of the openings 130, and optionally, from one or more openings to the periphery of the foot. This groove or slot feature is shown on only one foot 66 in FIG. 9 but could be provided on all feet, if desired. The first portion 136 is defined at least in part by the opening(s) 130, and includes the material between the periphery and the opening(s) and slots 134. One or more second portions 138 is/are defined by or within the openings 130 and/or grooves 134. In at least some implementations, the slots 134 may extend axially to a depth less than the depth of the openings 130.

Figure 10:
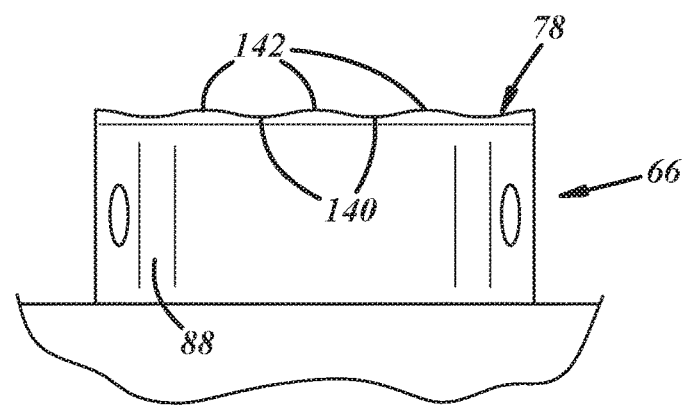
FIG. 10 is a fragmentary perspective view of a portion of a plunger.

In FIG. 10, the foot 66 includes a non-planar axial end 78. In this example, the axial end 78 is wavy and includes rounded grooves or second portions 140, rather than the more sharp-edged grooves as shown in FIGS. 4-8. The first portions 142 may also be rounded and generally convex with an axially outer portion defining the contact surface and arranged to engage the lock member 56 in use. The grooves or second portions 140 may be less distinct visually, but the axial end 78 includes one or more second portions at a different axial height than one or more first portions 142. Of course, other arrangements are possible, including the formation of pyramidal sections where the sharp or more pointed apex of the pyramid defines the first portion rather than a curved, wavy profile as shown in FIG. 10. In this and other implementations, the grooves or other voids need not extend axially into the free end of the foot and can extend inwardly at some other angle.

Further, in at least some implementations, one or both of the plunger 54 and lock member 56 may include one or more magnets or other inserts in the region of the contact surface. The magnets may facilitate joint movement of the plunger and lock member if desired. One or more magnets or other inserts may define at least part of one or more contact surfaces, and one or more magnets or other inserts may have a first portion at a different axial height than a second portion (e.g. the magnet(s) may include a void that defines the second portion).

Figure 11:
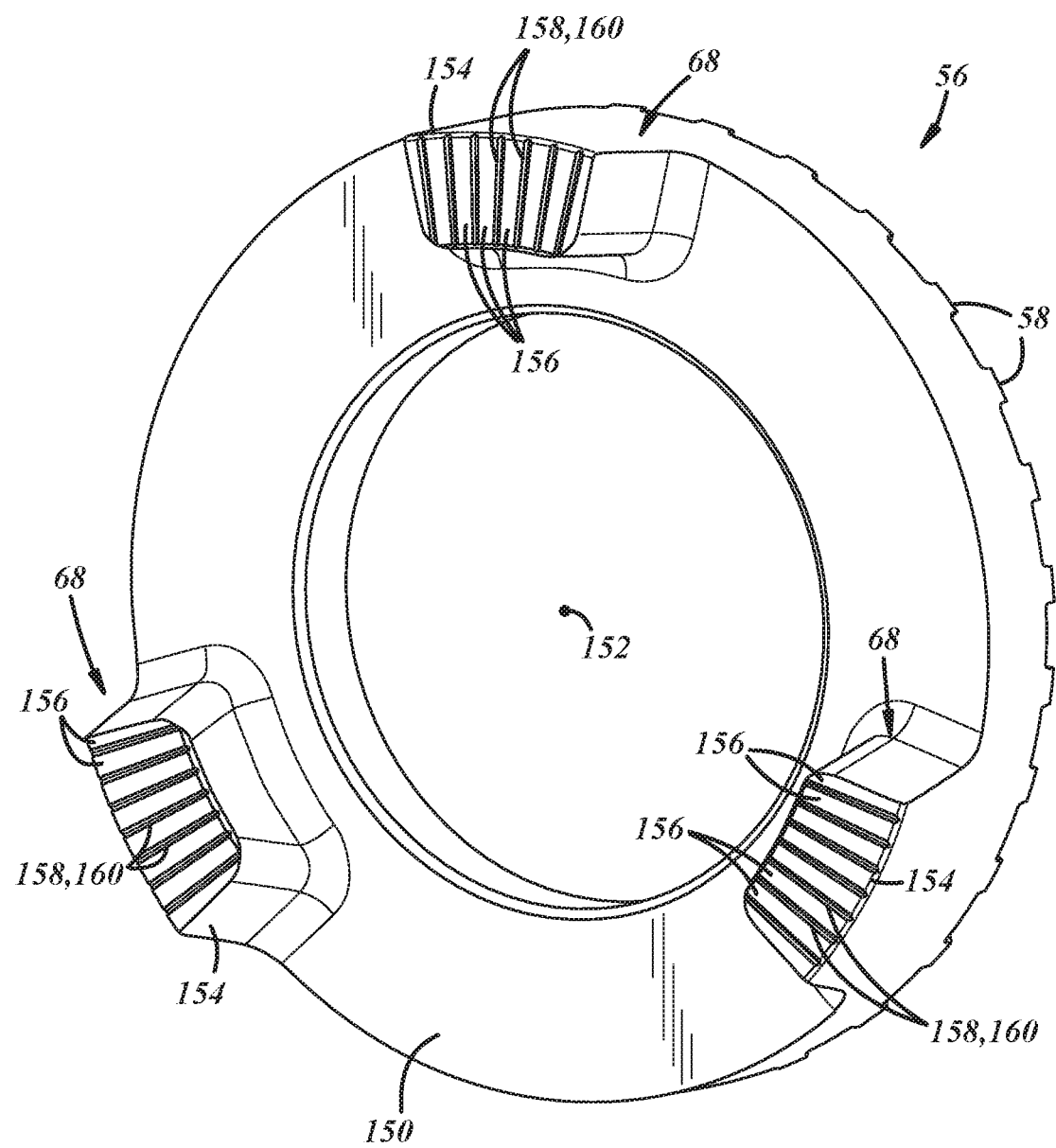
FIG. 11 is a perspective view of lock member of the locking mechanism.

One example of a lock member 56 is shown in FIG. 11. The lock member may include an annular main body 150 having an axis, and one or more feet 68, which may correspond in number to the number of feet 66 on the plunger 54. The feet 68 may extend axially from the main body 150 of the lock member 56 and may extend in the opposite direction as the teeth 58 of the lock member. The feet 68 may be of the same general construction as the feet 66 of the plunger 54 and have a circumferential length, radial width and axial height, (relative to an axis 152 of the lock member 56), and may also have an axially outer end 154 with first and second portions 156, 158 at different axial heights. In the example shown in FIG. 11, grooves 160 are formed in the axial end 154 of each foot 68, and the grooves 160 may be like those shown and described with regard to FIGS. 4 and 5. Any other arrangement of types of grooves or voids may be provided, as desired, including but not limited to the various voids, or first and second portions shown in FIGS. 7-10. The lock member may thus have at least one contact surface that is discontinuous (e.g. not planar), and where the discontinuity is defined at least in part by a void.

In use of the locking mechanism 46, fluid and contaminants within the housing 37 may come into contact with and tend to accumulate on the contact surfaces of the plunger 54 and/or lock member 56. Such things may cause problems with the operation of the locking mechanism 46 or otherwise be undesirable. For example, contaminants may cause the plunger 54 to unevenly or not uniformly engage the lock member and may thus cause the lock member 56 to become tilted and potentially stuck against another component, such as the housing 37. If the lock member 56 becomes tilted, the teeth 58 may unevenly or not uniformly engage the gear teeth 60, causing undesirably high stress on the fewer teeth 58, 60 that are initially engaged, which may damage the lock member and/or gear. During the return stroke of the lock mechanism 46, the lock member 56, under force of the return spring 55, may unevenly or not uniformly engage the plunger 54, which may cause the plunger to become tilted and potentially jammed or stuck. Further, accumulation of particles between the contact surfaces of the plunger 54 and lock member 56 may cause the lock member to be too close to the gear in the unlocked position (i.e. reduce the clearance between them) and unintended locking of the differential may occur if these components become engaged. Still further, some systems include position detection sensors or control schemes and the contamination between the components may change the relative positions of these components and cause their positions to be falsely or incorrectly determined.

To reduce such contamination, the voids may function to reduce or eliminate contaminants from the contact surfaces. For example, contaminants may tend to settle or flow in the voids, contaminants may be pushed into the voids during incidents of engagement between the plunger and lock member, and contaminants may be pushed into the voids during any relative rotation between the plunger and lock member. This reduces the amount of contamination on the contact surface. Further, the contaminants in the voids may be moved to the periphery of the feet 66, 68 and away from the contact surfaces by being pushed or moved by other contaminants being moved into the voids, or, for example, by lubricant/oil within the differential housing 37. This flushing or moving of the contaminants away from the axial end of the feet 66, 68 may be improved where the voids extend to or communicate with the periphery of the foot as this provides an outlet for the contaminants even when the lock member 56 and plunger 54 are engaged.

While certain arrangements and forms of voids have been shown, others are possible. Further, different arrangements and forms of voids may be used in combination (e.g. openings and grooves).

It is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. In the preceding description, various operating parameters and components are described for one or more exemplary embodiments. These specific parameters and components are included as examples and are not meant to be limiting.

Reference in the preceding description to "one example," "an example," "one embodiment," "an embodiment", "an implementation" or "at least some implementations" means that a particular feature, structure, or characteristic described in connection with the example is included in at least one example or implementation including one or more but not necessarily all innovative features or components. References to various examples, embodiments or implementations do not necessarily refer to the same example, embodiment or implementation each time it appears.

The invention claimed is:

1. A system for a vehicle differential that has multiple gears, the system comprising:
   a magnetic field generator that selectively generates a magnetic field;
   a drive member movable in response to the magnetic field generated by the magnetic field generator, the drive member being movable along an axis between a first position and a second position, and the drive member having at least one contact surface; and
   a lock member adjacent to the drive member and having at least one contact surface that is engaged by the at least one contact surface of the drive member so that the lock member is driven by the drive member to engage a gear of the differential when the drive member is in the second position, and the lock member is adapted to be disengaged from the gear when the drive member is in the first position, wherein one or both of the drive member and the lock member has at least one contact surface that includes a void extending axially in the at least one contact surface such that the at least one contact surface is discontinuous.

2. The system of claim 1 wherein the discontinuous contact surface is defined at least in part by multiple voids formed in one or both of the drive member and the lock member.

3. The system of claim 1 wherein one or both of the drive member and the lock member includes a main body and a foot extending from the main body, and wherein the discontinuous contact surface is defined by a void formed in an axial end of the foot so that an axially outermost surface of the foot is interrupted by the void.

4. The system of claim 3 wherein the discontinuous contact surface is defined at least in part by one or more voids formed in the foot.

5. The system of claim 4 wherein the voids include multiple grooves that are separate from each other.

6. The system of claim 4 wherein the voids include multiple grooves and wherein at least some of the grooves intersect each other.

7. The system of claim 3 wherein the foot is cantilevered to the main body and extends to an axial end, and the axial end is not planar.

8. The system of claim 7 wherein the axial end includes multiple first portions at a different axial height than a second portion, wherein the second portion is located between at least two of the multiple first portions so that the at least two portions are not continuous with each other.

9. The system of claim 3 wherein the discontinuous contact surface is defined at least in part by an opening formed in an axial end of the foot.

10. The system of claim 9 wherein the void includes a hole extending axially into the axial end.

11. The system of claim 10 which also includes a passage extending through the foot axially spaced from the axial end, and wherein the hole communicates with the passage.

12. The system of claim 3 wherein at least one void is formed in the foot and the void extends to at least one peripheral edge of the foot.

13. The system of claim 12 wherein at least two peripheral locations of the foot are communicated with one or more voids.

14. An apparatus for a vehicle differential, comprising:
    a drive member having an axis and including an annular main body with multiple feet extending from the main body, at least one foot having a contact surface; and
    a lock member having an axis and including an annular main body with multiple feet extending from the main body, at least one foot of the lock member having a contact surface engageable by one or more of the contact surfaces of the drive member, wherein at least one contact surface of one or both of the drive member and the lock member has multiple first portions at a first height and a second portion at a second height that is different than the first height, wherein the second portion is between at least two of the multiple first portions.

15. The drive member of claim 14 wherein the feet are cantilevered to the main body and have a free end on which the contact surface is defined.

16. The drive member of claim 14 wherein the contact surface is defined at least in part by one or more voids formed in at least one foot and defining the second portion.

17. The drive member of claim 16 wherein the one or more voids include at least two voids that are separate from each other or wherein the at least two voids intersect each other.

18. The drive member of claim 16 wherein at least one void extends to at least one peripheral edge of the foot.

19. A system for a vehicle differential that has multiple gears, the system comprising:
    a magnetic field generator that selectively generates a magnetic field;
    a drive member movable in response to the magnetic field generated by the magnetic field generator, the drive member being movable between a first position and a second position, and the drive member having at least one contact surface; and
    a lock member adjacent to the drive member and having at least one contact surface that is engaged by the at least one contact surface of the drive member so that the lock member is driven by the drive member to engage a gear of the differential when the drive member is in the second position, and the lock member is adapted to be disengaged from the gear when the drive member is in the first position, wherein one or both of the drive member and the lock member has at least one contact surface that is discontinuous, wherein one or both of the drive member and the lock member includes a main body and a foot extending from the main body, and wherein the discontinuous contact surface is defined by the foot, wherein the discontinuous contact surface is defined at least in part by one or more voids formed in the foot, and wherein: a) the voids include multiple grooves that are separate from each other; or b) the voids include multiple grooves and at least some of the grooves intersect each other.

* * * * *